United States Patent [19]
Ahrens et al.

[11] Patent Number: 6,148,419
[45] Date of Patent: Nov. 14, 2000

[54] SYSTEM DIAGNOSTIC LOCATION CODES

[75] Inventors: George Henry Ahrens; Mike Conrad Duron, both of Pflugerville; Robert Allan Faust, Austin; Forrest Clifton Gray, Austin; Kurt Paul Szabo, Austin, all of Tex.

[73] Assignee: International Business Machines Corp., Armonk, N.Y.

[21] Appl. No.: 09/164,132

[22] Filed: Sep. 30, 1998

[51] Int. Cl.[7] .................................................. G06F 11/00
[52] U.S. Cl. ................................. 714/25; 714/48; 710/15
[58] Field of Search ........................ 395/500.38, 500.42; 710/15–19; 714/7–9, 25–32, 44–48

[56] References Cited

U.S. PATENT DOCUMENTS

| | | | |
|---|---|---|---|
| 4,654,800 | 3/1987 | Hayashi et al. ........................ | 700/236 |
| 5,182,755 | 1/1993 | Sekiguchi et al. ..................... | 714/55 |
| 5,296,869 | 3/1994 | Jonker et al. ........................... | 345/24 |
| 5,502,814 | 3/1996 | Yuuki et al. ............................ | 714/32 |
| 5,586,254 | 12/1996 | Kondo et al. ......................... | 714/25 |
| 5,611,069 | 3/1997 | Matoba .................................. | 711/114 |
| 5,689,416 | 11/1997 | Shimizu et al. ....................... | 364/185 |
| 5,973,919 | 10/1999 | Larabell ................................. | 361/684 |
| 5,995,916 | 11/1999 | Nixon et al. ........................... | 702/182 |

*Primary Examiner*—Christopher B. Shin
*Attorney, Agent, or Firm*—Kelly K. Kordzik; Winstead Sechrest & Minick P.C.; Leslie A. Van Leeuwen

[57] ABSTRACT

A multitude of devices coupled to a processor are each given a location code, which is then displayed in proximity to each of the devices. Then, when the processor indicates an error within a particular device, the service person can easily find which device has the error by the displayed location code associated with the device.

9 Claims, 2 Drawing Sheets

SYSTEM DIAGNOSTIC LOCATION CODES

TECHNICAL FIELD

The present invention relates in general to data processing systems, and in particular, to a technique for determining the location of an error.

BACKGROUND INFORMATION

Large computer server systems may comprise a significant amount of equipment arranged in several racks or cabinets. One or more processors mounted within one of the racks will then be coupled to various devices, including input/output ("I/O") devices, which may be mounted within separate racks. The cabling coupling all of these components may be quite complicated, including running the cables under a raised floor between the racks.

A problem with such an arrangement is evidence when an error occurs within one of the I/O drawers holding the I/O devices. When this happens, it is desired to quickly identify and replace which device needs to be replaced (e.g., a particular circuit board mounted on a particular I/O board in a drawer). Presently, identifying the I/O drawers which contain the field replaceable unit (FRU) to be replaced by the service person is a tedious manual method subject to human error. The only way to identify the I/O drawer is to trace the cables from the processor board through the sequence of I/O drawers and correlate the drawer positions to reference drawings in printed service manuals until the correct drawer is found. In large systems with a large number of I/O drawers and a multitude of I/O adapters, including the resultant cabling (which can be quite complicated as discussed above), this can be challenging.

Therefore, there is a need in the art for an apparatus that permits an easy identification of an FRU that needs to be replaced.

SUMMARY OF THE INVENTION

The present invention addresses the foregoing need by providing a display with each I/O drawer. Upon system initialization by the central processor, the processor identifies and establishes an ID (identification) label for each of the I/O drawers. This ID label is shown on the display associated with each I/O drawer. Then, when an error occurs within an I/O adapter, a display associated with the processor will note the identification of the drawer in which the device is mounted. The service person then needs only find the I/O drawer having a corresponding ID label, which eliminates the need for tracing cables from the processor through each of the I/O drawers.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
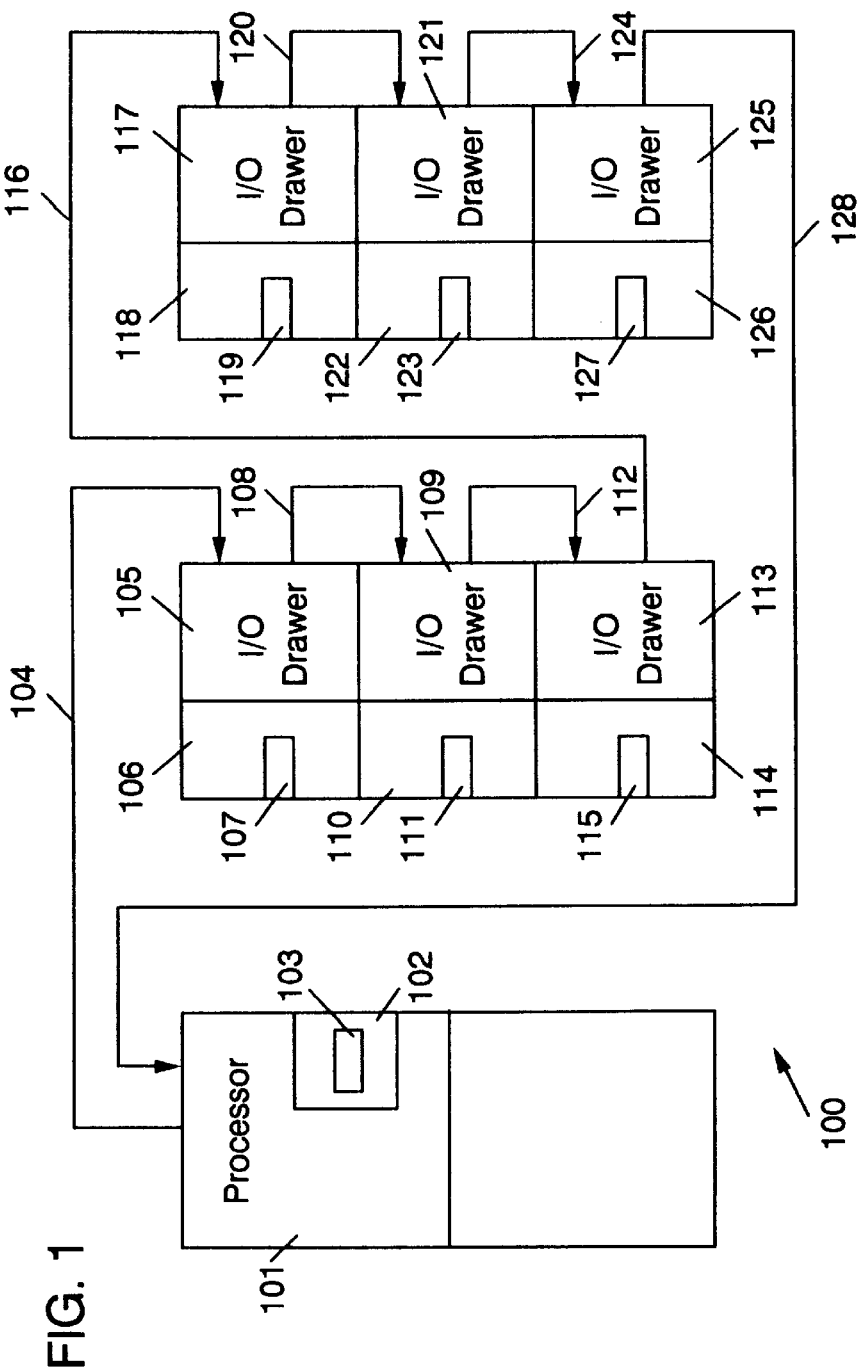
FIG. 1 illustrates a data processing system configured in accordance with the present invention.

In the following description, numerous specific details are set forth such as display formats, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention is described with respect to errors occurring in adapter cards located within I/O drawers in a data processing system. However, the present invention is applicable to any device coupled to a processor.

Referring to FIG. 1, there is illustrated data processing system 100 configured in accordance with the present invention. Processor 101 is coupled in a loop to I/O drawers 105, 109, 113, 117, 121, and 125 via cables 104, 108, 112, 116, 120, 124, and 128. Thus, there is an order in which the I/O drawers 105, 109, 113, 117, 121, 125 are arranged with respect to processor 101.

Associated with processor 101 is an operational panel 102, which includes a display 103, such as an LCD display, for displaying where in system 100 an error has been detected. This location may be in the form of a code that identifies the architected location of the component incurring the error. The detection of errors within various components in system 100 is well-known in the art and not described in further detail herein. For purposes of the present invention, when an error occurs within a device in system 100, operational panel 102 will show on display 103 the location of the error.

Figure 2:
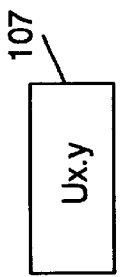
FIG. 2 illustrates the display associated with the processor in accordance with the present invention.

FIG. 2 illustrates further detail of display 103. When an error in an I/O drawer occurs, the error information, which includes the architected location code, is presented by the system diagnostics in processor 101 to the service person by display 103. This architected location code, shown as Ux.y.NNNN . . . N, will indicate the rack or cabinet (e.g., x), the I/O drawer (e.g., y), and the particular I/O adapter (e.g., NNNN . . . N) within that drawer that has the error.

As discussed above with respect to the prior art, the service person would then have to locate which rack, or cabinet, that contains the I/O drawer having the defective component. This would amount to the tracing through one or more of cables 104, 108, 112, 116, 120, 124, and 128. This is not only tedious and time consuming, but is prone to human error.

Figure 3:
FIG. 3 illustrates the display associated with each of the I/O drawers in accordance with the present invention.

The present invention solves this problem by including an indicator panel 106, 110, 114, 118, 122, and 126 proximate to each I/O drawer 105, 109, 113, 117, 121, and 125, respectively. Each indicator panel has a corresponding display 107, 111, 115, 119, 123, and 127. The remainder of the discussion will pertain solely to display 107, which is further illustrated in FIG. 3. However, please note, that the discussion is applicable to the other indicator panels and their corresponding displays.

Display 107 shows the architected drawer location of its corresponding I/O drawer 105 at all times. This location code (Ux.y) is passed to the indicator panel 106 via communication with the processor 101 during the initialization and boot process, which is further discussed below with respect to FIG. 4. When the system is powered off or is in the process of initializing and booting, it displays the last known location code that it was assigned. After communication between the I/O drawer 105 and the processor 101 is established, the location code may be updated to reflect any configuration changes that may have occurred when the system 100 was powered off. This sensing and updating of location codes is handled by firmware in the processor 101.

When an error in an I/O drawer, the error information, which includes the architected location code, is presented by the system diagnostics to the service person by display 103, the service person then visually locates the location code that matches on one of the I/O drawers as shown by display 107. This identifies the I/O drawer that contains the FRU (defective component) to be replaced.

Figure 4:
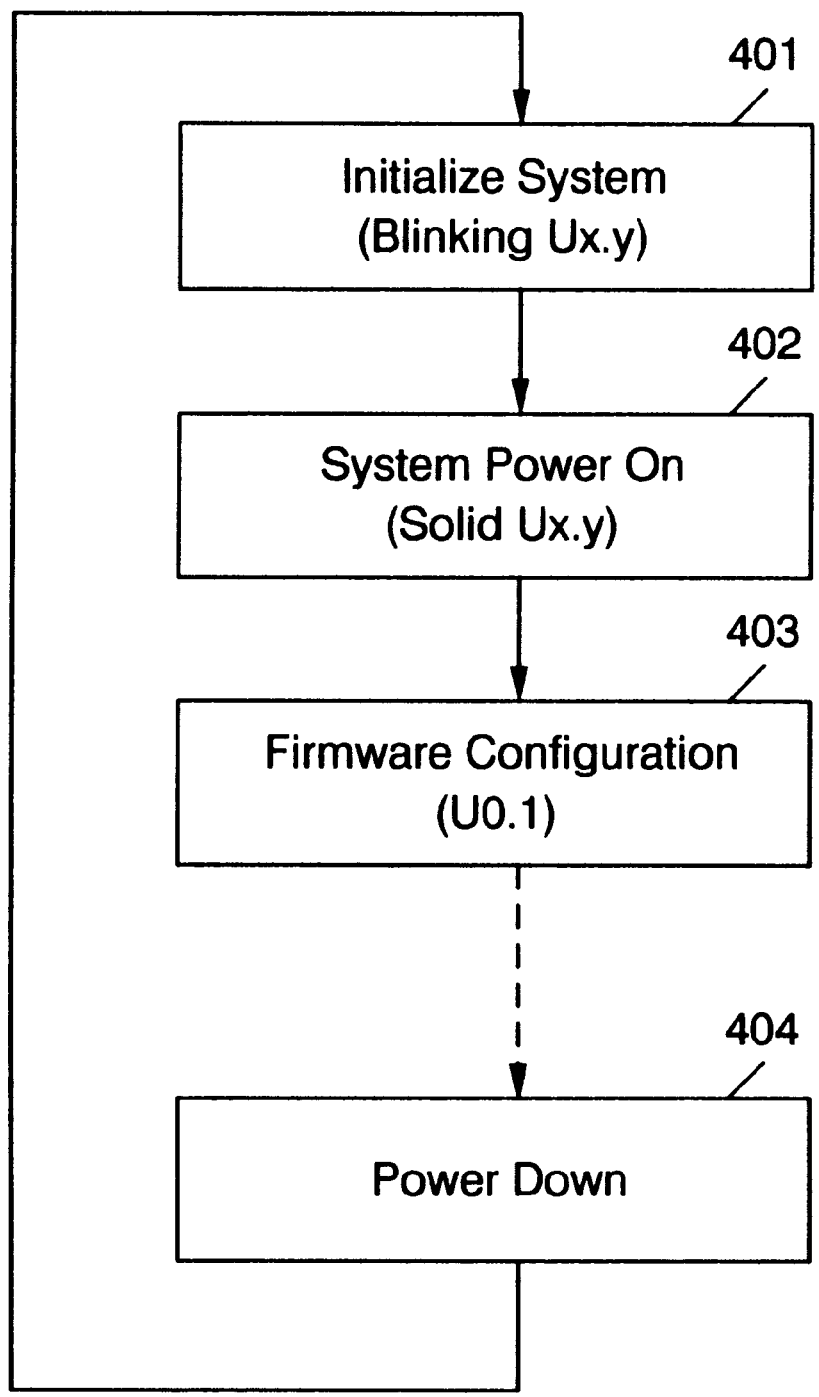
FIG. 4 illustrates a flow diagram in accordance with the present invention.

Referring next to FIG. 4, there is illustrated a process for establishing and displaying a location code. In step 401, system 100 is initialized (e.g., plugged into a power supply). At this point in time, display 107 will show a blinking "Ux.y". In step 402, when the system is powered on, the "Ux.y" will no longer blink but will be solidly displayed. In step 403, the firmware configuration and boot process will occur. The operation of firmware to identify the contents and configuration of system 100 is well-known. Since cables 104, 108, 112, 116, 120, 124, and 128 form a loop, this firmware will be able to establish the order of I/O drawers 105, 109, 113, 117, 121, and 125. Each I/O drawer will then be given a location code by the firmware, which will then be displayed on its associated display 107, 111, 115, 119, 123, and 127. For example, display 107 may show "U0.1", which indicates that I/O drawer 105 is the first drawer within the loop. Regardless of its exact code, the designated code will then be displayed in step 403 on display 107 for viewing by the service person. As a result, when display 103 indicates that there is an error in "U0.1.NNNN . . . N", the service person will then be able to determine which I/O drawer has the defective component by looking at each of displays 107, 111, 115, 119, 123, and 127 to find the drawer displaying "U0.1".

After a time period, the process may proceed to step 404 whereby the service person may power down system 100 for service. The process will then return to step 401 upon initialization of the system. At this point in time, display 107 will show a blinking "U0.1", which indicates the last known location code designation for I/O drawer 105. At step 402, this "U0.1" will be solidly displayed. Then, at step 403, when the processor 101 performs the firmware configuration, if the cabling has been rearranged, or an additional I/O drawer has been inserted between processor 101 and I/O drawer 105, display 107 will show a different location code corresponding to the location of I/O drawer 105 within the loop formed by processor 101 and the other I/O drawers 109, 113, 117, 121, and 125. As a result, processor 101 determines the location code for each of the I/O drawers and this location code is then displayed in proximity to each of the corresponding I/O drawers.

Although the present invention and its advantages have been described in detail, it should be understood that various changes, substitutions and alterations can be made herein without departing from the spirit and scope of the invention as defined by the appended claims.

What is claimed is:

1. A data processing system comprising:

a processor coupled to a plurality of peripheral devices by a bus system;

circuitry for determining a unique location code for each of the plurality of peripheral devices; and a display on each of the plurality of peripheral devices for displaying the location code pertaining to its respective peripheral device.

2. The system as recited in claim 1, further comprising:

circuitry for re-determining unique location codes for each of the plurality of peripheral devices when an arrangement of the plurality of peripheral devices is modified.

3. The system as recited in claim 1, further comprising:

a display associated with the processor for displaying the unique location code of a particular one of the plurality of peripheral devices when it incurs an error.

4. The system as recited in claim 1, wherein the display is located proximate to its respective peripheral device.

5. The system as recited in claim 4, wherein the bus system arranges the plurality of peripheral devices in a loop with respect to the processor.

6. A method comprising the steps of:

connecting a plurality of devices to a processor via a bus system;

determining relative locations of the plurality of devices with respect to each other and the processor;

assigning unique location codes to each of the plurality of devices as a function of their relative locations; and displaying in proximity to each device its unique location code.

7. The method as recited in claim 6, further comprising the steps of:

detecting an error in one of the plurality of devices;

displaying the location code of the one of the plurality of devices having the error.

8. The method as recited in claim 7, wherein the location code of the one of the plurality of devices having the error is displayed by the processor.

9. The method as recited in claim 6, further comprising the steps of:

rearranging the relative locations of the plurality of devices with respect to each other and the processor;

re-assigning unique location codes to each of the plurality of devices as a function of their rearranged relative locations; and displaying in proximity to each device its re-assigned unique location code.

* * * * *